Dec. 5, 1961  C. G. CONWAY ET AL  3,011,761
TURBINE BLADES
Filed Nov. 21, 1955  2 Sheets-Sheet 1

Cyril Gordon Conway
Michael Charles George Smith
Inventor
By
Stevens, Davis, Miller + Mosher
their Attorneys Dec. 5, 1961  C. G. CONWAY ET AL  3,011,761
TURBINE BLADES
Filed Nov. 21, 1955  2 Sheets-Sheet 2

INVENTOR,
CYRIL GORDON CONWAY
MICHAEL CHARLES GEORGE SMITH

ATTORNEYS

United States Patent Office 3,011,761
Patented Dec. 5, 1961

3,011,761
TURBINE BLADES
Cyril Gordon Conway, Kingston-on-Thames, and Michael Charles George Smith, Ipswich, England, assignors to Power Jets (Research and Development) Limited, London, England, a British company
Filed Nov. 21, 1955, Ser. No. 548,188
Claims priority, application Great Britain Nov. 25, 1954
13 Claims. (Cl. 253—39.15)

This invention relates to turbine blades operating at high temperatures and is concerned with the cooling of such blades by effusion or "sweat" cooling. The invention is particularly, though not necessarily exclusively, applicable to blades for gas turbines.

In applying the above mentioned method of cooling, it has been previously proposed in British patent specification No. 619,634 to make a turbine blade of a longitudinally fluted core covered by a fluid permeable outer skin, coolant fluid flowing along the flutes and outwardly through the skin. This arrangement has the disadvantage that parts of the skin are necessarily blocked by the parts of the core between the flutes.

According to the present invention a turbine blade comprises an inner longitudinal core, a fluid permeable outer skin around the core and spaced therefrom to permit the flow of coolant fluid, and a fluid permeable intermediate layer filling the space between and bonded to the outer skin and the core, the permeability of the intermediate layer being high compared with that of the outer skin.

Preferably the outer skin and intermediate layer are of sintered material, and the particle size of the intermediate layer is large compared with that of the outer skin. The core, intermediate layer and outer skin may all be of metal, or the core may be of metal, and intermediate layer of cermet, and the outer skin of cermet or ceramic.

According to a feature of the invention, the thickness and/or the permeability of the outer skin is varied around the periphery of the blade in such a manner as to permit the greatest flow of coolant therethrough and hence the greatest cooling effect at the regions of highest stress, and greatest external heat transfer, and also to allow for variations in external pressure.

One embodiment of the invention will now be described by way of example with reference to the accompanying drawings, of which FIGURE 1 is a transverse section of a turbine rotor blade, the section being taken on the line I—I in FIGURE 2.

Figure 1:
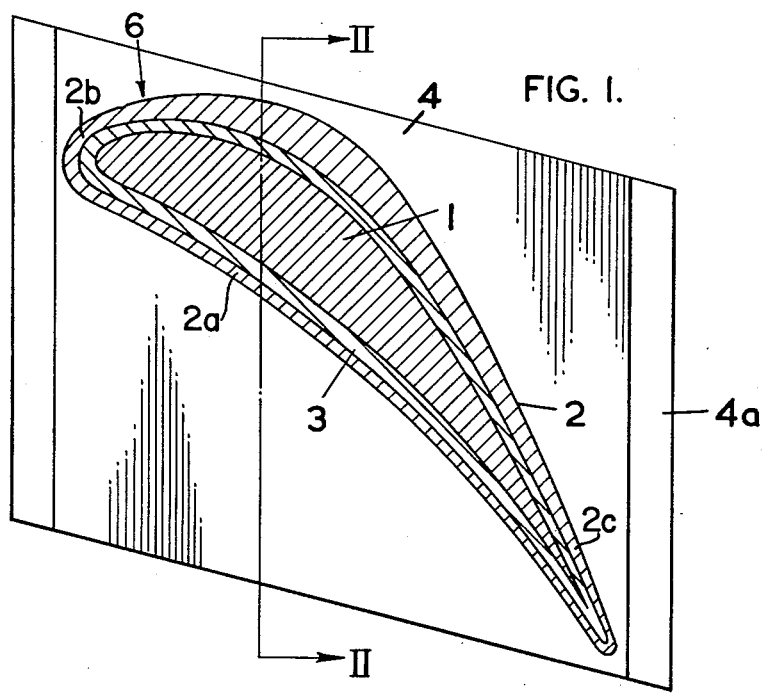
Figures 2, 3:
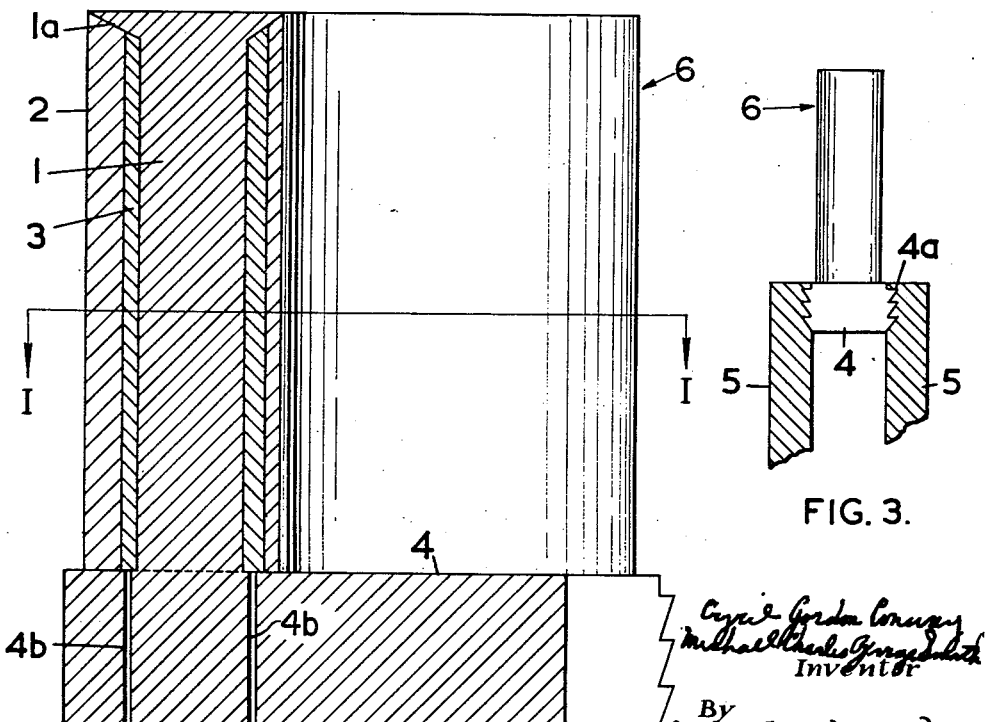
FIGURE 2 is a longitudinal section of the blade taken on the line II—II in FIGURE 1.
FIGURE 3 is a view of the blade mounted on a turbine rotor, portions of the rotor discs being shown in section.

As shown in FIGURES 1 and 2, the blade 6 is made up of an inner longitudinal core 1 and an outer skin 2, the core and skin defining between them a space extending continuously around the periphery of the blade. The space is filled with an intermediate layer 3. The core 1 is integral with a blade root 4 and is formed at its tip end with an enlargement 1a forming a retaining step with which the tip ends of the skin and intermediate layer engage.

The outer skin 2 of the blade is of varying thickness around the blade periphery, being thickest on the convex side of the blade and having relatively thin portions 2a, 2b, 2c on the concave side of the blade and at the leading and trailing edges.

The core, intermediate layer and skin are all of sintered construction, being built up by powder metallurgy techniques and finally sintered. Pre-sintering may be employed at intermediate stages of manufacture. The core 1 is such that it is substantially non-permeable, but the skin 2 and intermediate layer 3 are fluid permeable, the intermediate layer being of comparatively high permeability and of large particle size, while the outer skin is of low permeability and of much smaller particle size. For example, the intermediate layer may have a porosity of about 30% and a particle size of the order of 0.01 inch, while the outer skin may have a porosity of not more than 5% and a particle size of the order of 3 microns.

As shown in FIGURE 3, the blade root 4 is formed with serrations 4a and is secured between two rotor discs 5 having corresponding seatings on their faces. Other known methods of attaching the blade 6 to the rotor may be used. The blade shown is of course one of a row of similar blades. The root 4 is formed with inlet passages 4b connecting the space between the rotor discs 5 to the space filled by the intermediate layer 3. The size of these holes is such that their total flow area is about the same as the effective flow area of the space filled by the intermediate layer.

In operation, a coolant fluid, e.g. air bled off from a compressor driven by the turbine, is supplied to the space between the rotor discs and flows through passages 4b and through the intermediate layer 3 in which the pressure drop is fairly low due to the comparatively high permeability thereof. Due to the lower permeability of the outer skin 2, the pressure drop therein is comparatively high, so the flow therethrough is almost wholly outwards normal to and distributed over substantially the whole of the blade skin surface. The air takes up heat while flowing along the intermediate layer and considerably more heat from the outer skin and when issuing reduces the heat transfer to the blade surface from the hot turbine gases. Effusion of the air takes place over the whole outer surface of the blade skin as there is no blockage of parts of the outer skin. The air issuing through the outer skin not only has a blanketing effect reducing the heat transfer between the blade and the hot gas, but also tends to prevent the deposition of fine ash particles (which may be corrosive) on the blade surface.

Provision is made for varying the flow of coolant through the outer skin 2 around the periphery of the blade in such a way that the cooling effect is greatest at the regions of highest stress and greatest external heat transfer i.e. maximum heat transfer between the turbine working fluid and the blade. Thus at these regions the coolant flow must be greatest. In addition at the regions where the external pressure is highest there must be the minimum resistance to flow through the outer skin. Accordingly the skin is such that it is thinnest at the regions referred to. In practice it will not generally be possible to achieve the required variation of coolant flow by varying the thickness of the skin alone, and so in addition it is necessary to vary the permeability of the skin around the blade periphery, the permeability being greatest at the regions referred to. Of course the regions of highest stress, greatest external heat transfer, and highest external pressure are not necessarily the same and it may be necessary to effect a compromise. In the blade shown the outer skin is thinnest and its permeability greatest in the region of the blade leading edge 2b, on the concave side of the blade 2a, and on the convex side of the blade towards the trailing edge 2c.

Figure 4:
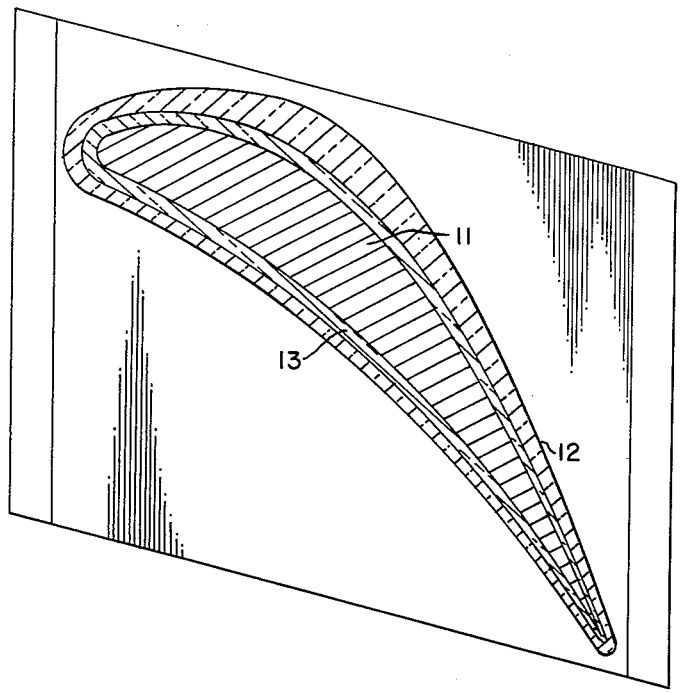
FIGURE 4 is a transverse section, similar to that of FIGURE 1, of another turbine rotor blade.

The thickness of the intermediate layer 3 may be constant around the periphery of the blade, or in some cases it may be necessary for it to be thinner towards the blade trailing edge (as shown in FIGURE 4.)

In a turbine in which corrosion is unlikely to occur, e.g. one operating on distillate fuel, the blade may be entirely of metal, e.g. a cobalt-chrome, nickel chrome, or nickel-cobalt-chrome blade alloy as shown in FIGURES 1 and 2. In a turbine operating on, for example, residual oil which is liable to give rise to corrosion, the outer skin may be of ceramic or cermet, i.e. a metal-ceramic mixture, in which case different materials may be used for the core, intermediate layer and outer skin. Thus as shown in FIGURE 4 the core 11 may be of metal, the intermediate layer 13 of cermet and the outer skin 12 of ceramic, the materials being selected so that there is a graduation of the properties of thermal conductivity and expansion and strength so that differential stresses are reduced. Alternatively the core may be of metal and both the intermediate layer and outer skin of cermet material.

In operation, the core is screened from the hot gas stream and is thus at a much lower temperature than the outer skin and is accordingly able to withstand greater loads than would be otherwise possible. In the sintering operation the intermediate layer and outer skin are bonded to one another and to the core so that they are partly supported by the latter.

Our novel turbine blade construction is susceptible of employment in other environments than those depicted and may be fabricated by various techniques well known in the art and thus our invention is intended to be limited only insofar as set forth in the appended claims.

It will be appreciated that the invention is equally applicable to turbine stator blades.

We claim:

1. A turbine blade having root and tip ends and comprising a fluid-permeable outer skin defining a single internal cavity extending from the root to the tip end of the blade; a substantially impermeable inner core extending longitudinally of the whole length of said cavity and defining with the skin a space for the flow of coolant fluid, said space extending continuously around the core and from the root to the tip end of the blade; an intermediate fluid-permeable layer entirely filling said space and bonded to outer skin and the core, the permeability of said intermediate layer being high compared with that of the outer skin; means defining an inlet to said space at said root end; and means for supplying coolant fluid to said inlet.

2. A turbine blade according to claim 1 wherein the core, the intermediate layer and the outer skin are of metallic material.

3. A turbine blade according to claim 1 wherein the core is of metallic material, the intermediate layer is of permeable cermet material, and the outer skin is of at least partly ceramic material.

4. A turbine blade according to claim 1 wherein the core is of metallic material, the intermediate layer is permeable of cermet material, and the outer skin is permeable of ceramic material.

5. A turbine blade according to claim 1 wherein the core is of metallic material and the intermediate layer and outer skin are of cermet material.

6. A turbine blade according to claim 1 wherein the thickness of the outer skin is varied around the periphery of the blade, the thickness being least at the regions of highest stress, greatest external heat transfer and highest external pressure.

7. A turbine blade according to claim 6 wherein the outer skin is thinnest in the region of the blade leading edge, on the concave side of the blade, and on the convex side of the blade towards the trailing edge.

8. A turbine blade according to claim 1 wherein the permeability of the outer skin is varied around the periphery of the blade, the permeability being greatest at the regions of highest stress, greatest external heat transfer and highest external pressure.

9. A turbine blade according to claim 8 wherein the permeability of the skin is greatest in the region of the blade leading edge, on the concave side of the blade, and on the convex side of the blade towards the trailing edge.

10. A turbine blade having root and tip ends and comprising a fluid-permeable outer skin of sintered material defining a single internal cavity extending from the root to the tip end of the blade; a substantially impermeable inner core extending longitudinally of the whole length of said cavity and defining with the skin a space for the flow of coolant fluid, said space extending continuously around the core and from the root to the tip end of the blade, an intermediate fluid-permeable layer of sintered material entirely filling said space and bonded to the outer skin and the core, the permeability of said intermediate layer being high compared with that of the outer skin; means defining an inlet to said space at said root end; and means for supplying coolant fluid to said inlet.

11. A turbine blade according to claim 10 wherein the particle size of the material of the intermediate layer is large compared with that of the outer skin.

12. A turbine blade according to claim 10 wherein the core is of sintered material.

13. In a turbine, a rotor; a row of radially extending turbine rotor blades disposed around the periphery of said rotor, each blade having radially inner and outer ends and comprising a root part at its inner end, a fluid permeable outer skin defining a single internal cavity extending from the inner to the outer end of the blade, a substantially impermeable inner core integral with the root and extending longitudinally of the whole length of the cavity and defining with the skin a space for the flow of coolant fluid, said space extending continuously around the core and from the inner to the outer end of the blade, and an intermediate fluid-permeable layer entirely filling said space and bonded to the outer skin and the core, the permeability of said intermediate layer being high compared with that of the outer skin, the root being formed with an inlet to the inner end of said space; means securing said roots to the rotor; and means for supplying cooling fluid to said inlet.

References Cited in the file of this patent

UNITED STATES PATENTS

| | | |
|---|---|---|
| 2,431,660 | Gaudenzi | Nov. 25, 1947 |
| 2,479,057 | Bodger | Aug. 16, 1949 |
| 2,648,520 | Schmitt | Aug. 11, 1953 |
| 2,851,216 | Scanlan | Sept. 9, 1958 |

FOREIGN PATENTS

| | | |
|---|---|---|
| 608,766 | Great Britain | Sept. 21, 1948 |
| 619,634 | Great Britain | Mar. 11, 1949 |
| 981,719 | France | Jan. 17, 1951 |
| 1,073,330 | France | Mar. 24, 1954 |